May 10, 1938.                    E. H. BRAYER                    2,116,778
                              METERING APPARATUS
                            Filed May 29, 1937                 4 Sheets-Sheet 1

May 10, 1938.　　　E. H. BRAYER　　　2,116,778
METERING APPARATUS
Filed May 29, 1937　　　4 Sheets-Sheet 2

May 10, 1938.　　　　E. H. BRAYER　　　　2,116,778
METERING APPARATUS
Filed May 29, 1937　　　4 Sheets-Sheet 4

Inventor
Edward Harold Brayer
by Popp and Popp
Attorneys

Patented May 10, 1938

2,116,778

UNITED STATES PATENT OFFICE 2,116,778

METERING APPARATUS

Edward Harold Brayer, Buffalo, N. Y., assignor to Brayer Brothers Construction Corporation, Buffalo, N. Y., a corporation of New York Application May 29, 1937, Serial No. 145,592

22 Claims. (Cl. 221—101)

This invention relates to a meter and more particularly to a liquid metering system in which the operator sets the mechanism to deliver a definite quantity of liquid and in which after this quantity of liquid has been delivered the mechanism automatically stops the flow and can reset itself to its original condition. The meter shown is primarily designed for use in mixing hot asphalt compounds, the present application being an improvement on the meter shown in my copending application Ser. No. 145,591, filed May 29, 1937.

As with my said copending application, the invention is not limited to the particular field mentioned but has a wide range of uses, for example, in gasoline and oil service stations where it would enable the operator to take care of a number of pumps, since after the operator sets each pump to the desired gallonage a delivery of fuel or oil and the resetting of the mechanism is automatic. Further, the invention can be readily adapted to self-service gasoline or oil pumps by the addition of a coin controlled mechanism and the invention can also be used in filling containers with a definite volume of liquid and by the addition of further well known automatic mechanisms, such as photocells or timing mechanisms, could be adapted to continuously fill containers on a moving belt with definite volumes of liquid. The invention can also be employed in connection with the blending of gasolines, lubricants and other liquids, blending being readily accomplished by having one or more meters operating in accordance with the invention and delivering the liquids to be blended through a common discharge. The invention can also obviously be used to measure the charges of water to a concrete mixer.

The principal object of the present invention is to provide an improved and simplified construction of the form of meter shown in my said copending application Ser. No. 145,591, filed May 29, 1937, and in particular to provide a differential mechanism connecting the metering mechanism and the return motor with the indicating and automatic control mechanism which is of simple and rugged construction.

Another object of the invention is to interpose an accumulator mechanism between the differential drive and the recording and control mechanism, this accumulator mechanism permitting the differential to be revolved a number of times during the operation of metering the desired quantity of fluid. By this means the differential can be made of much larger and more rugged construction than that shown, for example, in my said copending application and the meter as a whole can be made more sensitive in its operation.

Another object of the present invention is to provide a simple and convenient means for setting the mechanism to deliver any desired amount of fluid, these means including a crank which is removable so that the mechanism cannot be reset without the use of the particular crank designed for use with the mechanism.

Other objects of the present invention are to provide a metering mechanism which is simple, reliable, compact and accurate and which includes an indicating mechanism which can be set to any desired volume indication and is, upon starting the flow of liquid through the meter, turned to zero and then returned to the set volume indication preparatory to the next charge of liquid being delivered.

Another object of the invention is to provide a metering system in which the setting, starting, stopping and indicating mechanism can be located at a point distinctly remote from the meter so that the operation of supplying metered quantities of liquid can be controlled from any place and without reference to the location of the meter. If desired, of course, the indicating, setting, starting and stopping mechanism can be directly coupled to the meter.

Another purpose is to provide such a metering system which can be set to deliver any desired amounts of liquid and will maintain this setting as long as the same volumes are desired to be delivered.

Another purpose of the present invention is to provide a simple and sensitive means for stopping the flow of liquid when the recording mechanism reaches zero and simultaneously starting the reset motor to restore the recording mechanism to its previous setting.

Further aims of the present invention are to provide such a metering system in which parts of standard construction can be employed; which is compact in construction and composed of relatively few moving parts and which will operate efficiently to accurately deliver preselected quantities of liquid and will maintain its operating efficiency for a long period of time under conditions of severe and continuous usage without getting out of order or requiring repairs.

In its general organization the present invention comprises a meter, a solenoid valve for starting and stopping the flow of liquid through the meter and an indicating mechanism which is operatively connected with the meter and includes a differential, one ring gear of which is driven by the meter, the other ring gear of which is driven by a reset motor and the spider of which drives an indicating mechanism. The spider of the differential also operates a pair of accumulator wheels which in turn control a pair of electrical switches for stopping the flow of fluid when the indicator mechanism reaches zero; for simultaneously starting the reset motor; and for stopping the reset motor when the indicating mechanism reaches the desired setting. Means are also provided for adjusting the relation of the accumulator wheels and the recording mechanism to the spider of the differential so that the mechanism can be conveniently set to deliver repeated quantities of liquid in any desired volume.

The liquid to be metered is delivered from a liquid supply line 15, through a solenoid valve 16 and thence passes through a meter 17 to a discharge pipe 18. The meter 17 can be of any usual and well known construction and in the form of the invention shown in Figs. 1–10 includes a vertical shaft 19 which drives the automatic recording and controlling mechanism hereinafter described and which is contained within a casing 20. The solenoid valve 16 can be of any usual and well known construction and includes a movable core 21 which is drawn upwardly when the winding 22 of the solenoid is energized and in this movement opens the valve to admit liquid to the meter 17. The indicating and control mechanism is mounted on a base 25 which in turn is mounted on posts 26 rising from a spider 27 carried by the casing of the meter 17. The purpose of the posts 26 and spider 27 is to insulate the indicating and control mechanism from the meter 17, this being especially important when high temperature asphalts or the like are being handled by the meter. The casing 20 for the indicating and control mechanism can be secured in any suitable manner and is shown as having a window 28 through which the wheels of the recording mechanism are visible and an opening 29 through which the indicating and control mechanism can be set to indicate and deliver any desired volume of liquid as hereinafter described.

Figures 5, 6, 7:
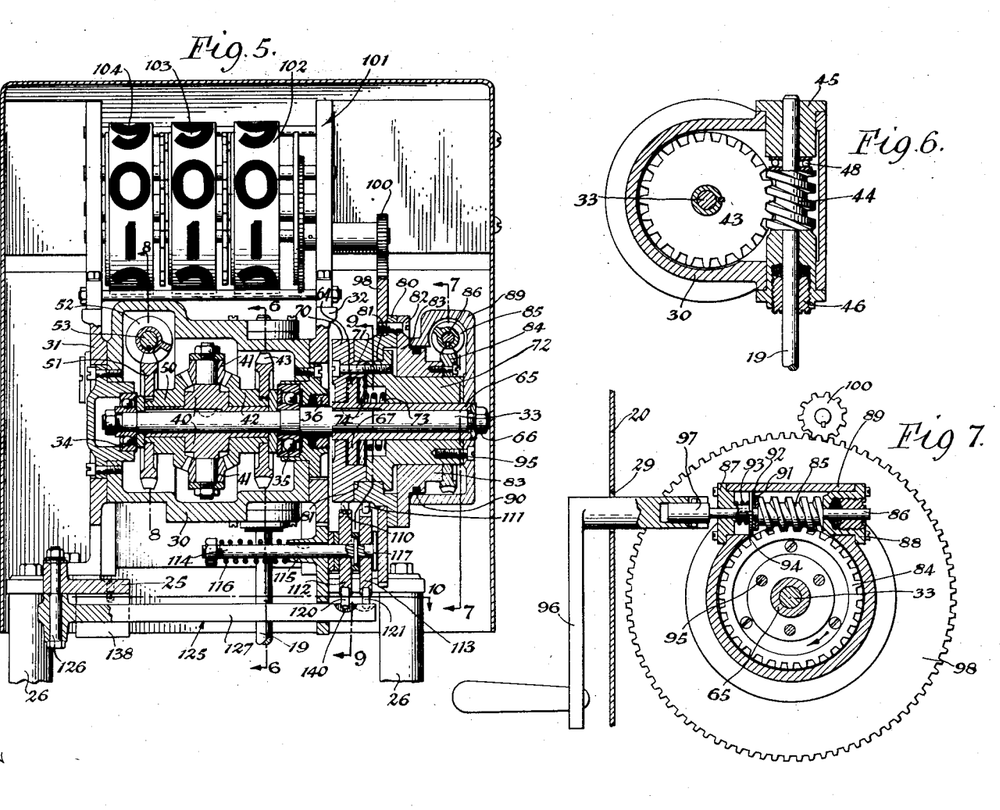
Fig. 5 is a vertical transverse central section.
Figs. 6, 7, 8 and 9 are vertical fragmentary fore and aft sections, taken on the correspondingly numbered lines on Fig. 5.

As best illustrated in Fig. 5 the indicating and control mechanism includes a differential which is adapted to be driven from one side by the metering shaft 19 and from its other side by a reset motor, the spider of this differential driving the recording mechanism and an electrical control mechanism, a fixed relation always being maintained between the recording mechanism and the electrical control mechanism but being adjustable with relation to the spider of the differential so that the system can be set to deliver and visually record any desired gallonage. The differential is contained within an enclosed housing 30 which is suitably secured between frame members 31 and 32 rising from the base 25 and includes a main shaft 33 which is journaled at one end in a roller bearing 34 and projects horizontally outward through a roller bearing 35 and stuffing box 36 mounted in the front wall of the housing 30.

To the main shaft 33 is keyed a spider 40 carrying a plurality of pinions 41 which are freely mounted on the spider 40 and rotate on radial axes. At one side the pinions 41 are engaged by a ring gear 42 which is loosely mounted on one end of the hub provided by the spider 40, this ring gear 42 being driven by a worm wheel 43 which is fixed thereto. This worm wheel 43, as best shown in Fig. 6, is driven by a worm 44 fast to the meter shaft 19, this meter shaft extending vertically and being journaled in bearings 45 and 46.

Figures 8, 9, 10, 11:
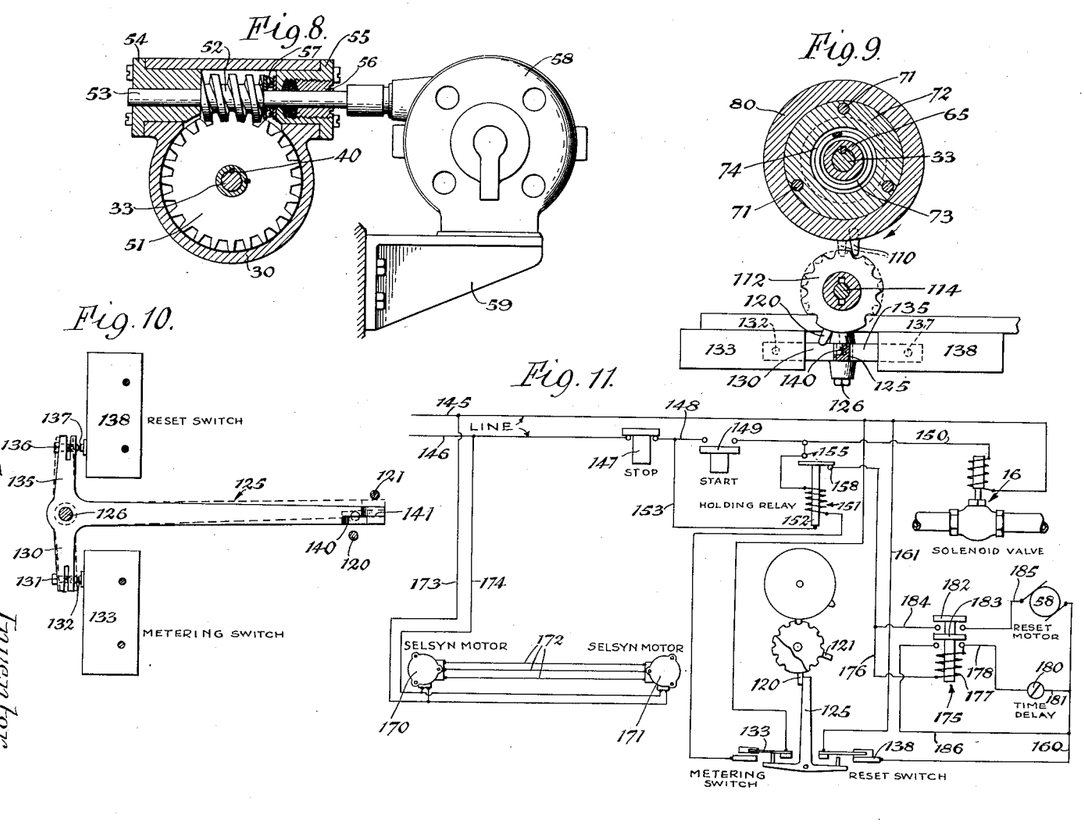
Fig. 10 is a fragmentary horizontal section, taken on line 10—10, Fig. 5.
Fig. 11 is a view similar to Fig. 2 showing a modified form of wiring diagram which can be employed.

The opposite sides of the pinions 41 are engaged by a ring gear 50 which is loosely mounted on the opposite end of the hub of the spider 40 and is driven by a worm wheel 51 which is fixed to the ring gear 50 in any suitable manner. As best shown in Figs. 5 and 8 this worm wheel is driven by a worm 52 which is fast to a horizontal reset shaft 53, this shaft being suitably journaled in bearings 54 and 55 carried by the differential housing 30. In order to prevent the escape of the lubricant the bearing 55 is provided with a stuffing box 56 and a thrust bearing 57 is also provided between this bearing and the worm 52 to reduce friction. The reset shaft 53 is driven by a reset motor 58 which is shown as being mounted on a bracket 59 projecting rearwardly from the frame members 31 and 32.

From the above organization it will be seen that the meter 17, through its shaft 19, rotates the differential shaft 33 in one direction and that the reset motor 38, through its shaft 53, rotates the differential shaft 33 in the opposite direction.

That portion of the differential shaft 33 surrounded by the stuffing box 36 is enlarged and against the outer shoulder formed by this enlargement a sleeve 65 is held by means of a nut 66 at the outer end of the differential shaft. This sleeve 65 is keyed to the differential shaft 33 so as to turn therewith and at its inner end is provided with a flange 67 faced with friction disks to provide a friction clutch 64. The innermost of these friction disks is engaged by a collar 70 which is loosely mounted on the inner end of the collar 65 and is recessed to house the flange 67 and its friction disks. This collar 70 is secured by horizontal screws 71 to an outer collar 72 which is loosely mounted on the outer end of the collar 65. The collar 72 is recessed at its inner end to house a helical compression spring 73 which urges a washer 74 against the outer friction disk of the flange 67. It will therefore be seen that the collars 70 and 72 are normally driven in unison with the differential shaft 33 through the friction clutch provided by the flange 67 but that, through this friction clutch, the collars 70 and 72 can be rotatably adjusted relative to this shaft.

The means for so adjusting the collars 70 and 72 relative to the shaft 33 comprises a ring 80 rotatably mounted in an annular groove 81 jointly provided by the sleeves 70 and 72 and secured by means of screws 82 to a ring 83 rotatably mounted on the sleeve 72. A worm wheel 84 is secured against the outer face of the ring 83 and this worm wheel is engaged by a worm 85 mounted on a normally horizontal shaft 86. This shaft is journaled at its opposite ends in bearings 87 and 88 mounted in a housing 89 which encloses the worm wheel and gear and is filled with lubricant. To prevent the escape of this lubricant a sealing or packing ring 90 is provided between the ring 83 and the inner part of the gear case 89 as best shown in Fig. 5. In order to prevent the recording apparatus from creeping, a washer 91 is press fitted to the worm shaft 86 and against this washer a fiber washer 92 is pressed by a spring 93, a washer 94 being interposed between the spring 93 and the fiber washer 92 and this last washer 94 being pinned to the bearing 87, as best shown in Fig. 7, so as to be incapable of rotation. The gear housing 89 is fixed to the collar 72 by a plurality of screws 95 so that the worm gear 84 is held in fixed relation to the collars 70 and 72 while the rings 80 and 83 can be rotated relative to these collars 70 and 72 by turning the worm 85.

The shaft 86 on which this worm 85 is mounted is turned by means of a removable crank 96, the hub of which is inserted through the opening 29 in the housing and is formed to interlock with a fitting 97 provided at the end of the worm shaft 86, as best illustrated in Fig. 7.

The screws 82 which secure the rings 80 and 83 together also secure a gear 98 to the ring 80, as best shown in Fig. 5. This gear 98 drives a pinion 100 of a recording mechanism indicated generally at 101. The construction of this recording mechanism forms no part of the present invention and hence is not illustrated in detail but is shown as including a units wheel 102, a tens wheel 103 and a hundreds wheel 104, the figures on which are visible through the window 28.

Since the sleeves 70 and 72, through the friction clutch 64 normally rotate with the differential shaft 33 and since the gear casing 89 is secured to the sleeve 72 by the screws 95, it will be seen that the worm 85 journaled in this gear casing 89 will turn the worm wheel 84 and the rings 83 and 80 connected thereto, thereby driving the gear 98 and recording mechanism 101 in unison with the differential shaft 33. Since the meter shaft 19 turns this differential shaft 33 in one direction and the reset motor 58 turns this differential shaft in the opposite direction it will be seen that in any fixed position of operation the meter and reset motor will cause movement of the recording wheels in opposite directions. In the device as shown the meter causes the recording wheels 102—104 to move from any predetermined setting to zero and the reset motor causes these wheels to move from zero back to said predetermined setting by a control mechanism which is preferably constructed as follows:

A counting finger or tooth 110 is mounted to project radially from the collar 70 and a similar counting finger or tooth 111 is mounted to project radially from the ring 80. The finger 110 engages the teeth of an accumulator or counting wheel 112 and the finger 111 engages the teeth of an accumulator or counting wheel 113 in such manner that each time either of these fingers is rotated a complete revolution, the corresponding accumulator wheel is moved one tooth. The accumulator wheels 112 and 113 are frictionally mounted on a shaft 114 in any suitable manner. As shown in the drawings this frictional mounting for the accumulator wheels is provided by slidingly mounting the shaft 114 in a slideway 115 formed in the frame plate 32 and by providing a spring 116 which urges this shaft inwardly. The outer end of the shaft is provided with a head 117 which bears against the outer face of the accumulator wheel 113 and suitable spacing washers are interposed between the accumulator wheels and between the accumulator wheel 112 and the frame plate 32 to hold the accumulator wheels in proper position to be engaged by the fingers 110 and 111.

Figure 4:
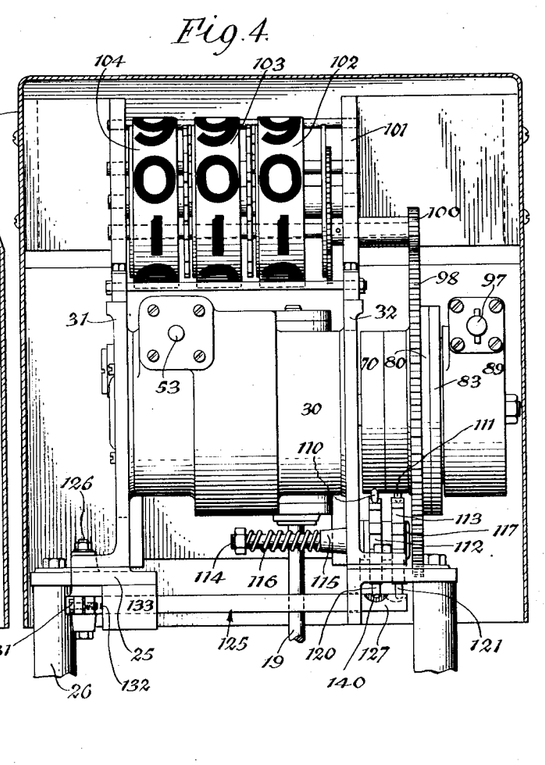
Fig. 4 is a vertical transverse section taken on line 4—4, Fig. 3.

The accumulator wheel 112 carries a zero finger or pin 120 and the other accumulator wheel 113 carries an adjustable finger 121. The zero and adjustable fingers project radially from untoothed portions of their respective accumulator wheels and strike the opposite sides of a horizontal T-shaped switch lever indicated generally at 125. As best shown in Figs. 4, 5 and 10, this switch lever 125 is mounted on a vertical pin 126 which is carried by the base 25 and the long arm 127 extends into the paths of the zero and adjustable stop pins 120 and 121. The short arm 130 of the switch lever carries an adjusting screw 131 which engages and moves the button 132 of a microswitch 133, this switch being a metering switch. The other short arm 135 carries an adjusting screw 136 which engages and moves the button 137 of a reset microswitch 138. The microswitches 133 and 138 are of usual and well known construction and operate, with a very slight inward movement of their buttons, to open an electrical circuit therethrough. In order to render the switch arm 125 very sensitive in its response to engagement by the pins 120, 121, the extreme end of the long arm 127 thereof is cut away on one side to form a central shoulder 140 and is cut away on the other side to form a central shoulder 141. These shoulders 140 and 141 are arranged in the paths of the pins 120 and 121 and are engaged thereby. It will be seen that by this means the movement of the switch arm 125 is very slight because both the zero pin and the adjustable pin engage the switch arm in the same plane and because the microswitches 133 and 138 are extremely sensitive to slight movement of the switch arm.

Figure 1:
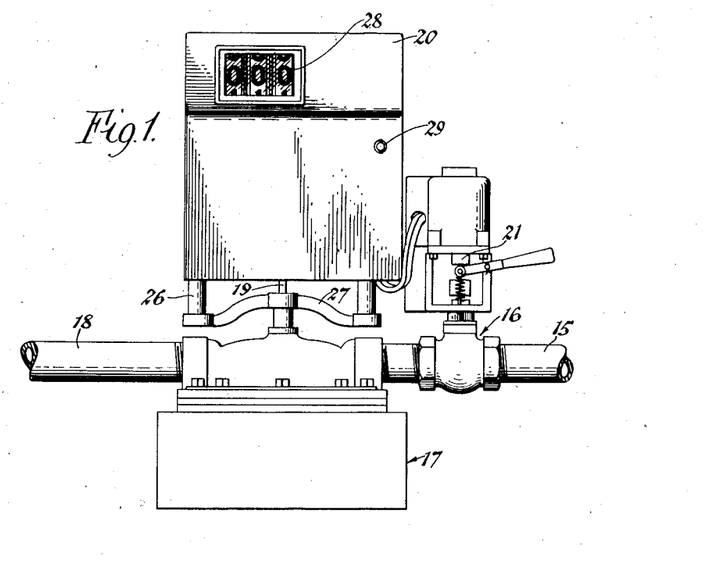
Fig. 1 is a front elevation of a metering system and automatic control and recording mechanism made in accordance with my invention.
Figure 2:
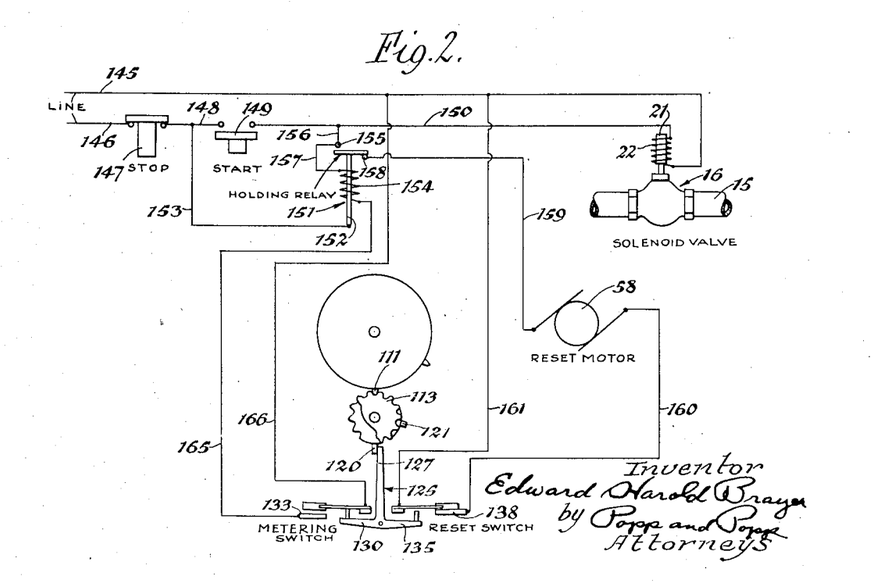
Fig. 2 is a wiring diagram showing the electrical connection between the various parts.
Figure 3:
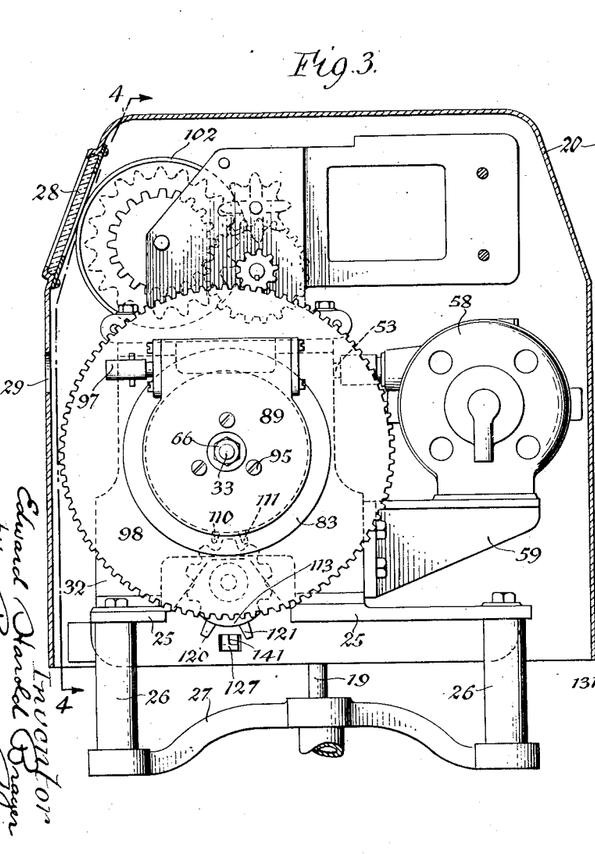
Fig. 3 is a vertical fore and aft section showing the recording and control mechanism in elevation.

Referring now to the wiring diagram shown in Fig. 2 the power lines 145 and 146 supply alternating current at, say, 110 volts and one is connected to the winding 22 of the solenoid switch 16 and the other is connected through a normally closed stop button 147, line 148 and a normally open start button 149 with a line 150 leading to the other end of the winding 22 of the solenoid valve 16. A holding relay 151 is provided, the armature 152 of which is permanently connected by a line 153 with the line 148 between the start and stop buttons. When the winding 154 of the holding relay 152 is energized its armature is moved to engage a contact 155 which is connected by a line 156 with the power line 150 and by a line 157 with the winding 154. When the holding relay 151 is deenergized the armature 152 engages with a contact 158 of a line 159 leading to the reset motor 58, the other line 160 from this reset motor connecting with the reset switch 138. The other terminal of the reset switch 138 is connected by a line 161 with the main power line 145. The opposite end of the winding 154 of the holding relay 151 is connected by a line 165 with the metering switch 133, the other terminal of which is connected by a line 166 with the main power line 145. It is apparent that it is not necessary to mount the recording and control mechanism directly over one another but that these two mechanisms could be remotely located and electrically connected. Such a system is illustrated in Fig. 11 which contains the additional provision of a time delay mechanism which causes the recording mechanism to pause at its zero setting for a brief interval. The purpose of such pause is to facilitate inspection of the apparatus since otherwise, as hereinafter described, the moment the recording mechanism reaches its zero setting the reset motor is immediately energized to return the mechanism to the original setting. This requires a close observation to determine that the mechanism actually reaches zero should a municipal or State inspector desire to check up on this feature.

In order to permit of locating the control mechanism, contained within the housing 20, remote from the meter 17 a pair of Selsyn motors 170, 171 are employed, one of these motors being driven by the metering shaft 19 and the other driving the worm 44 which in the form of the invention shown in Figs. 1–10 is mounted directly on the metering shaft 19, as best shown in Fig. 6. The Selsyn motors are interconnected by lines 172 and the motors are connected directly across the main power lines 145, 146 by branch lines 173 and 174. It is the characteristic of such motors that turning one motor will effect a similar movement of the other motor and it will therefore be seen that as one of these motors is turned by the metering shaft 19 the other motor will turn the worm 44 correspondingly. By this means the mechanism contained within the casing 22 can be located remotely from the meter 17 and the connection effected by the electrical lines 172, 173, 174.

In order to provide a time delay when the recording mechanism reaches zero the contact 158 of the holding relay 151 instead of being directly connected with the reset motor 58 is connected to this reset motor through a relay 175. For this purpose the contact 158 of the holding relay 151 is connected by a line 176 with the winding 177 of the holding relay 175, the other end of this winding being connected by a line 178 to a thermostat time delay unit 180. The other terminal of this time delay unit is connected by a line 181 with the line 160 which connects the reset motor 58 with the reset switch 138. The thermostatic time delay unit 180 can be of any well known type, such as are used as flashers in lighting circuits, these time delay units generally including a high resistance thermostatic element which when heated closes a circuit to short the element and permit it to again cool. The armature of the relay 175 carries two contactors 182 and 183. When the relay 175 is energized the contactor 182, through lines 184 and 185 connects the reset motor 58 with the line 176. Similarly, when the relay 175 is energized the contactor 183 connects the line 178 with a line 186 leading to the line 160.

*Operation*

With particular reference to the form of the invention shown in Figs. 1–10, assuming that it is desired to deliver, say, 120 gallons of liquid, the operator takes the crank 96, inserts it in the hole 29 in the casing 20 and engages it with the fitting 97 of the worm shaft 86. He then rotates the crank 96 until the wheels 102—104 register "120" through the window 28, this being effected through the following mechanism:

The turning of the worm shaft 86 turns the worm 85 (Fig. 7) and worm wheel 84, this worm wheel being secured to the ring 83 (Fig. 5) which is in turn secured to the ring 80 and large gear 98, these rings thereby turning with the worm gear 84. Since the large gear 98 connects with the pinion 100 driving the recording mechanism 101 it will be seen that turning the crank 96 adjusts the wheels 102—104 of the recording mechanism to indicate any desired gallonage.

This adjustment of the recording mechanism also effects a corresponding adjustment of the adjustable finger 121. Since the recording device has been adjusted from, say, zero to 120 the rings 80 and 83 have been rotated on the collars 70 and 72 a number of times whereby the pin 111 has moved the accumulator wheel 113 several teeth in a counter-clockwise direction as viewed in Fig. 2. The adjustable finger 121 is thereby spaced a predetermined distance from the zero finger 120 on the other accumulator wheel 112, the gap between these fingers determining the volume which is delivered.

The operator then removes the crank 96 and presses the start button 149, this closing a circuit through the line 146, closed stop switch 147, closed start switch 149, lines 150, 156, 157, winding 154 of holding relay 151, line 165, metering switch 133 (which in all positions other than zero is closed) and line 166 to the other side of the line. This energizes the holding relay and draws its armature 152 into engagement with the contact 155. Therefore upon release of the start button 149 the circuit is continued from the side 146 of line, through the stop button 147, line 153, armature 152 of the holding relay 151, contact 155, lines 156 and 150, through the winding 22 of the solenoid valve 16 to the other side 145 of line. The winding 22 of the solenoid valve 16 is thereby energized, first by closing the start button 149 and then through the holding relay 151 after the start button has been released.

The energization of the winding 22 opens the solenoid valve 16 and permits fluid to flow through the meter 17 thereby turning the metering shaft 19. The turning of the metering shaft through the worm 44 drives the worm wheel 43 thereby driving the ring gear 42. Since the other ring gear 50 is held stationary the pinions 41 which connect these ring gears rotate the spider 40 and the differential shaft 33 at half the speed of the worm wheel 43 and ring gear 42. The differential shaft 33 is thereby revolved, this shaft, through the sleeve 65 and friction clutch 64 revolving the entire assembly carried on its projecting end, this assembly including the collars 70 and 72, rings 80 and 83, gear 98, gear casing 89 and the worm gear and worm 84 and 85. Therefore during the metering operation the gear 98 rotates the pinion 100 so as to return the recording mechanism 101 towards zero and during the metering operation the pins 111 and 113 rotate in unison, thereby advancing both of the accumulator wheels 112 and 113 one tooth for each rotation of the assembly carried by the differential shaft 33. This rotation of the accumulator wheels moves the zero finger 120 toward the switch arm 127 and the adjustable finger 121 away from this arm. When the recording mechanism 101 reaches zero the zero finger 120 engages the arm 127 of the switch arm 125 and opens the metering switch 133 and closes the reset switch 138, as best illustrated in Fig. 2.

When this occurs the circuit through the winding 154 of the holding relay 151 is broken by opening the metering switch 133 and the armature 152 therefore moves out of engagement from the contact 155 and into engagement with the contact 158. Breaking the circuit between the armature 152 and the contact 155 breaks the circuit through the winding 22 of the solenoid valve 16, this valve thereby closing and cutting off the further flow of fluid through the meter 17. At the same time the closing of the reset switch 138 closes the circuit from line 145, through wire 161, reset switch 138, line 160, reset motor 58, line 159, contact 158, armature 152 of the holding relay 151 and lines 153 and 148 through the closed stop switch 147 to the other side 146 of the line. The energization of the reset motor, as best shown in Fig. 8, effects rotation of the worm shaft 53, thereby rotating the worm 52 and the worm wheel 51. This worm wheel is fast to the other ring gear 50 and since the meter has been cut out of operation and hence the ring gear 42 held stationary the rotation of the ring gear 50 will rotate the differential shaft 33 in the opposite direction from that provided by the meter and at one-half the speed of the ring gear. The entire assembly carried on the projecting end of the differential shaft 33 is thereby reversed in its rotation, the gear 98 operating the recording device 101 to move its wheels from zero back to the former setting which was assumed to be "120".

The reset motor, in revolving the assembly mounted on the projecting end of the differential shaft, revolves the pins 110 and 111 in a reverse direction and on each revolution of the assembly the accumulator wheels 112 and 113 are moved one tooth. This continues, the zero finger 120 moving away from the switch arm 127 and the adjustable finger 121 moving toward this switch arm until the adjustable finger 121 engages the switch arm 127. Since the relation between these two fingers has been set for 120 gallons the adjustable finger 121 will strike the switch arm 127 when "120" is reached on the recording device 101 at which time the adjustable finger 121 will throw the switch arm 127 to open the reset switch 138 and close the metering switch 133. When this occurs the circuit through the reset motor 58 is broken since one side of the reset motor 58 is connected through the now open reset switch 138 to one side of the line. The reset motor therefore stops and the entire apparatus comes to rest. At the same time the closing of the metering switch 133 sets up the circuit for starting so that upon pressing the start button 149 the cycle of operations will be repeated, 120 gallons being delivered.

Since the casing 89 for the adjusting worm 85 is held stationary in changing the setting of the apparatus it will be seen that the worm 85 is always brought back to the horizontal position shown in Fig. 7 at the end of each cycle of operations and hence is in position to effect resetting of the apparatus to deliver any desired gallonage by inserting the crank 96 and turning the worm 85 to effect such resetting as previously described. Further, it will be seen that by the provision of the clutch 64 the differential mechanism can overrun without breaking the fingers 120, 121, this clutch permitting the differential shaft 33 to overrun at either end of its movement after the fingers 120 or 121 have engaged the switch arm 125. By this means the recording device is stopped exactly at zero and exactly at the predetermined setting, even though the reset motor 58 and the meter do not stop instantly.

The circuit shown in Fig. 11 operates in substantially the same manner, except that there is additionally illustrated a pair of Selsyn motors, permitting the recording and controlling device to be located remotely from the meter, and there is also illustrated a thermostatic time delay for holding the whole mechanism at rest for an interval after the desired quantity of liquid has been metered out and when the recording mechanism is at zero.

One of the Selsyn motors 170 is driven by the meter shaft 19 and the other 171 drives the worm 44 of the controlling and recording mechanism. Both of these motors are connected together in the usual manner and are connected across the line 145, 146. Since Selsyn motors connected as shown are always synchronized in their movement the pair of Selsyn motors acts as a substitute for the direct connection of the meter shaft 19 with the worm 44 and hence permits the recording and control mechanism to be located at any desired distance from the meter instead of directly thereover, as illustrated in Figs. 1–10.

By the addition of the thermostat time delay 180 and the relay 175 the entire mechanism is made to pause for an interval when the flow of liquid has been cut off and the recording mechanism is at zero. In starting the operation the operator presses the start button which energizes the winding 22 of the solenoid valve 16, and also energizes the holding relay 151 so as to hold the solenoid valve 16 open as long as the metering switch 133 is closed, this operation being the same as in the form of the invention shown in Fig. 2. When the desired quantity of liquid has been metered and the recording mechanism reaches zero the zero finger 120 opens the metering switch 133 and closes the reset switch 138. When this occurs current flows from the side 145 of line through the line 161, closed reset switch 138, lines 160 and 181, through the thermostat time delay unit 180 and thence through line 178, winding 177 of the relay 175, line 176, contact 158, armature 152 of the holding relay 151, and lines 153 and 148 through the closed stop switch to the other side of the line. The time delay 180 is of such type that only a small amount of current is permitted to pass until it heats up and closes a circuit therethrough. The small amount of current initially passing through the time delay unit is not sufficient to operate the relay 175. However, when the element of the time delay 180 heats up and closes the circuit the winding 177 of the relay 175 is energized and its armature moves to connect the contactors 182 and 183 with the pairs of contacts arranged therebetween. When this occurs current from the line 160 passes through the reset motor 58, line 185, contactor 182, lines 184 and 176, contact 158, armature 152 of holding relay 151 and lines 153 and 148 through the closed stop switch to the side 146 of line. The reset motor is therefore energized after an interval determined by the setting of the time delay 180 and this energization continues until the reset finger 121 opens the reset switch 138 and breaks the circuit to the line 160. When the relay 175 is energized the time delay 180 is short-circuited, the current for the continued energization of the winding 177 of the relay 175 flowing from the line 160 through the line 182, contactor 183, winding 177 and thence through the line 176, armature 152 of holding relay 151, lines 153 and 148 and closed stop switch 147 to the side 146 of the line.

From the foregoing it will be seen that the present invention provides an extremely rugged, simple, compact, inexpensive and accurate meter in which the amount of liquid to be delivered can be preselected and which will deliver the preselected volume of the liquid and automatically restore the control and indicating mechanism to its pre-set position ready for another delivery of the same amount of liquid upon pressing the start button. It will also be noted that the control includes a differential which can be made of large size and rugged parts, this being permitted by the use of accumulator wheels driven by the differential and which permits the spider of the differential to be revolved a number of times during the operation of metering and of resetting the mechanism. It will also be noted that the meter and reset motor are constantly coupled with the differential and that the only clutch employed is a simple friction clutch which permits overrunning of the meter and reset motor without affecting the control mechanism.

I claim as my invention:

1. In a fluid metering system, metering means, means controlling the flow of fluid therethrough, a differential gear including a differential shaft, a spider fast to said differential shaft, a ring gear at each side of said spider and rotatable around said shaft, pinions rotatably mounted on said spider and meshing with both of said ring gears, means for driving one of said ring gears through motion derived from said metering means, a reset motor for driving the other ring gear to rotate said shaft in the opposite direction to reset the parts to initial position, and means actuated by said shaft for actuating said controlling means to stop the flow of fluid through said metering means and energizing said reset motor and subsequently deenergizing said reset motor.

2. In a fluid metering system, metering means, means controlling the flow of fluid therethrough, a differential housing, a differential in said housing including a shaft journalled in the opposite walls of said housing and projecting outwardly therefrom, a spider fast to said differential shaft within said housing, a ring gear at each side of said spider and rotatable around said shaft, pinions rotatably mounted on said spider and meshing with both of said ring gears, means for driving one of said ring gears through motion derived from said metering means, a reset motor for driving the other ring gear to rotate said shaft in the opposite direction to reset the parts to initial position, and means actuated by the projecting end of said shaft for actuating said controlling means to stop the flow of fluid through said metering means and energizing said reset motor and subsequently deenergizing said reset motor.

3. In a fluid metering system, metering means, means controlling the flow of fluid therethrough, a differential gear including a differential shaft, a spider fast to said differential shaft, a ring gear at each side of said spider and rotatable around said shaft, pinions rotatably mounted on said spider and meshing with both of said ring gears, means including a nonreversible worm gear for driving one of said ring gears through motion derived from said metering means, a reset motor for driving the other ring gear to rotate said shaft in the opposite direction to reset the parts to initial position, and means actuated by said shaft for actuating said controlling means to stop the flow of fluid through said metering means and energizing said reset motor and subsequently deenergizing said reset motor.

4. In a fluid metering system, metering means, means controlling the flow of fluid therethrough, a differential gear including a differential shaft, a spider fast to said differential shaft, a ring gear at each side of said spider and rotatable around said shaft, pinions rotatably mounted on said spider and meshing with both of said ring gears, means for driving one of said ring gears through motion derived from said metering means, a reset motor, a nonreversible worm gear drive between said reset motor and the other ring gear and arranged to rotate said shaft in the opposite direction from said metering means to reset the parts to initial position, and means actuated by said shaft for actuating said controlling means to stop the flow of fluid through said metering means and energizing said reset motor and subsequently deenergizing said reset motor.

5. In a fluid metering system, metering means, means controlling the flow of fluid therethrough, a differential gear including a differential shaft, a spider fast to said differential shaft, a ring gear at each side of said spider and rotatable around said shaft, pinions rotatably mounted on said spider and meshing with both of said ring gears, means for driving one of said ring gears through motion derived from said metering means and including a worm wheel fast to this ring gear and a worm driving said worm wheel, a worm wheel fast to the other ring gear, a worm driving said last worm wheel, a reset motor driving said last worm, said reset motor for rotating said shaft in the opposite direction from said metering means to reset the parts to initial position and means actuated by said shaft for actuating said controlling means to stop the flow of fluid through said metering means and energizing said reset motor and subsequently deenergizing said reset motor.

6. In a fluid metering system, metering means, means controlling the flow of fluid therethrough, a reset motor to reset the parts to initial position, a control shaft, means for driving said shaft in one direction by said metering means and in the opposite direction by said reset motor, a pair of control members mounted on said shaft to rotate therewith and rotatable relative to one another, adjusting means positively connecting said control members to rotate together and movable to adjustably rotate said control members relative to one another, means actuated by one of said control members for actuating said controlling means to stop the flow of fluid through said metering means and energizing said reset motor and means actuated by the other control member for deenergizing said reset motor whereby the relative adjustment of said control members determines the amount of fluid delivered.

7. In a fluid metering system, metering means, means controlling the flow of fluid therethrough, a reset motor to reset the parts to initial position, a control shaft, means for driving said shaft in one direction by said metering means and in the opposite direction by said reset motor, a pair of control members mounted on said shaft to rotate therewith and rotatable relative to one another, a worm gear fixed to one of said control members, a worm mounted on the other control member and meshing with said worm gear whereby upon turning said worm said control members are adjustably rotated relative to one another and positively held in such adjusted relation, means actuated by one of said control members for actuating said controlling means to stop the flow of fluid through said metering means and energizing said reset motor and means actuated by the other control member for deenergizing said reset motor whereby the relative adjustment of said control members determines the amount of fluid delivered.

8. In a fluid metering system, metering means, means controlling the flow of fluid therethrough, a reset motor to reset the parts to initial position, a control shaft, means for driving said shaft in one direction by said metering means and in the opposite direction by said reset motor, a control member mounted on said shaft to rotate therewith, a second control member rotatable relative to said first control member, a worm journalled in said first control member and having its axis arranged at right angles to said shaft, a worm wheel meshing with said worm and secured to said second control member concentrically therewith whereby upon turning said worm said second control member is adjustably rotated relative to said first control member, means actuated by said first control member for actuating said controlling means to stop the flow of fluid through said metering means and energizing said reset motor and means actuated by said second control member for subsequently deenergizing said reset motor, the relative adjustment of said control members thereby determining the amount of fluid delivered.

9. In a fluid metering system, metering means, means controlling the flow of fluid therethrough, a reset motor to reset the parts to initial position, a control shaft, means for driving said shaft in one direction by said metering means and in the opposite direction by said reset motor, a control member mounted on said shaft to rotate therewith, a second control member rotatable relative to said first control member, a worm journalled in said first control member and having its axis arranged at right angles to said shaft, a worm wheel meshing with said worm and secured to said second control member concentrically therewith whereby upon turning said worm said second control member is adjustably rotated relative to said first control member, means actuated by said first control member for actuating said controlling means to stop the flow of fluid through said metering means and energizing said reset motor, means actuated by said second control member for subsequently deenergizing said reset motor, the relative adjustment of said control members thereby determining the amount of fluid delivered and recording means geared to said second control member for indicating the amount of fluid so delivered.

10. In a fluid metering system, metering means, means controlling the flow of fluid therethrough, a reset motor to reset the parts to initial position, a control shaft, means for driving said shaft in one direction by said metering means and in the opposite direction by said reset motor, a control member mounted on said shaft to rotate therewith, a second control member rotatable relative to said first control member, adjusting means positively connecting said control members to rotate together and movable to adjustably rotate said second control member relative to said first control member and shaft, means actuated by said first control member for actuating said controlling means to stop the flow of fluid through said metering means and energizing said reset motor, means actuated by said second control member for subsequently deenergizing said reset motor, the relative adjustment of said control members thereby determining the amount of fluid delivered, a recording mechanism and means for actuating said recording mechanism through motion derived from said second control member whereby said recording mechanism is adjusted corresponding to the adjustment of said second control member relative to said first control member.

11. In a fluid metering system, metering means, means controlling the flow of fluid therethrough, a reset motor to reset the parts to initial position, a control shaft, means for driving said shaft in one direction by said metering means and in the opposite direction by said reset motor, a control member rotatable with said shaft, a friction clutch between said control member and shaft and normally compelling them to rotate together but permitting said shaft to overrun when said control member is stopped, a second control member mounted adjacent said first control member and rotatable relative thereto, adjusting means positively connecting said control members to rotate in unison and movable to rotate said control members relative to one another, means actuated by said first control member for actuating said controlling means to stop the flow of fluid through said metering means and energizing said reset motor, and means actuated by said second control member for subsequently deenergizing said reset motor.

12. In a fluid metering system, metering means, means controlling the flow of fluid therethrough, a reset motor to reset the parts to initial position, a control shaft, means for driving said shaft in one direction by said metering means and in the opposite direction by said reset motor, a control member rotatable with said shaft, a friction clutch between said control member and shaft and normally compelling them to rotate together but permitting said shaft to overrun when said control member is stopped, a second control member rotatably mounted on said first control member and shaft, adjusting means positively connecting said control members to rotate in unison and movable to rotate said control members relative to one another, means actuated by said first control member for actuating said controlling means to stop the flow of fluid through said metering means and energizing said reset motor and means actuated by said second control member for subsequently deenergizing said reset motor.

13. In a fluid metering system, metering means, means controlling the flow of fluid therethrough, a reset motor to reset the parts to initial position, a control shaft, means for driving said shaft in one direction by said metering means and in the opposite direction by said reset motor, a friction flange provided on said shaft, a control member including two collars mounted on opposite sides of said friction flange and means securing said collars together, means housed within said control member for urging said control member in one direction along said shaft to thereby maintain a friction drive between said friction flange and said control member, a worm carried by said control member and having its axis arranged at right angles to the axis of said shaft, a second control member concentric with and rotatably mounted on said first control member, a worm wheel fixed to said second control member and meshing with said worm whereby upon turning said worm said second control member is adjustably rotated relative to said first control member, means actuated by said first control member for actuating said controlling means to stop the flow of fluid through said metering means and energizing said reset motor and means actuated by said second control member for subsequently deenergizing said reset motor, the relative adjustment of said control members thereby determining the amount of fluid delivered.

14. In a fluid metering system, metering means, means controlling the flow of fluid therethrough, a reset motor to reset the parts to initial position, a control shaft, means for driving said shaft in one direction by said metering means and in the opposite direction by said reset motor, a friction flange provided on said shaft, a control member including two collars mounted on opposite sides of said friction flange and means securing said collars together, means housed within said control member for urging said control member in one direction along said shaft to thereby maintain a friction drive between said friction flange and said control member, a worm carried by said control member and having its axis arranged at right angles to the axis of said shaft, a second control member concentric with and rotatably mounted on said first control member, a worm wheel fixed to said second control member and meshing with said worm whereby upon turning said worm said second control member is adjustably rotated relative to said first control member, means actuated by said first control member for actuating said controlling means to stop the flow of fluid through said metering means and energizing said reset motor, means actuated by said second control member for subsequently deenergizing said reset motor, the relative adjustment of said control members thereby determining the amount of fluid delivered, a recording device and means for actuating said recording device through motion derived from said second control member whereby said recording device is adjusted corresponding to the adjustment of said second control member relative to said first control member.

15. In a fluid metering system, metering means, means controlling the flow of fluid therethrough, a reset motor to reset the parts to initial position, a control shaft, means for driving said control shaft in one direction by said metering means and in the opposite direction by said reset motor, a pair of accumulator wheels rotatably mounted adjacent said shaft and on an axis parallel therewith, means on said shaft for rotatively moving said accumulator wheels one step on each complete rotation of said shaft, means actuated by one of said accumulator wheels for actuating said controlling means to stop the flow of fluid through said metering means and energizing said reset motor, means actuated by the other accumulator wheel for subsequently deenergizing said reset motor and means for rotatively adjusting said accumulator wheels relative to one another thereby to regulate the amount of fluid delivered.

16. In a fluid metering system, metering means, means controlling the flow of fluid therethrough, a reset motor to reset the parts to initial position, a control shaft, means for driving said control shaft in one direction by said metering means and in the opposite direction by said reset motor, a supporting pin mounted adjacent to and parallel with said shaft, a pair of accumulator wheels independently and frictionally mounted on said pin, means on said shaft for rotatively moving said accumulator wheels one step on each complete rotation of said shaft, means actuated by one of said accumulator wheels actuating said controlling means to stop the flow of fluid through said metering means and energizing said reset motor, means actuated by the other accumulator wheel for subsequently deenergizing said reset motor and means for rotatively adjusting said accumulator wheels relative to one another thereby to regulate the amount of fluid delivered.

17. In a fluid metering system, metering means, means controlling the flow of fluid therethrough, a reset motor to reset the parts to initial position, a control shaft, means for driving said shaft in one direction by said metering means and in the opposite direction by said reset motor, a control member mounted on said shaft to rotate therewith, a second control member rotatable relative to said first control member, means for adjustably rotating said second control member relative to said first control member, a driving pin on each of said control members, a pair of accumulator wheels independently and rotatably mounted adjacent said shaft and an axis parallel therewith, said accumulator wheels being provided with teeth engaged by said pins to rotatively advance said accumulator wheels one step on each complete rotation of said shaft, means actuated by the accumulator wheel driven by said first control member for actuating said controlling means to stop the flow of fluid through said metering means and energizing said reset motor and means actuated by the other accumulator wheel for subsequently deenergizing said reset motor.

18. In a fluid metering system, metering means, means controlling the flow of fluid therethrough, a reset motor to reset the parts to initial position, a control shaft, means for driving said shaft in one direction by said metering means and in the opposite direction by said reset motor, a control member mounted on said shaft to rotate therewith, a second control member rotatable relative to said first control member, means for adjustably rotating said second control member relative to said first control member, a driving pin on each of said control members, a supporting pin mounted adjacent to and parallel with said shaft, a pair of accumulator wheels independently and frictionally mounted on said pin, each of said accumulator wheels being provided with teeth engaged by one of said pins to rotatively advance said accumulator wheels one step on each complete rotation of said shaft, means actuated by the accumulator wheel driven by said first control member for actuating said controlling means to stop the flow of fluid through said metering means and energizing said reset motor and means actuated by the other accumulator wheel for subsequently deenergizing said reset motor.

19. In a metering system, metering means, electrically actuated means controlling the flow of fluid therethrough, a reset motor to reset the parts to initial position, a control shaft, means for driving said shaft in one direction by said metering means and in the opposite direction by said reset motor, switch means in circuit with said controlling means, a second switch means in circuit with said reset motor, means actuated by said shaft when rotated by said meter for actuating said first switch means to actuate said controlling means to stop the flow of fluid through said metering means and simultaneously actuate said second switch means to operate said reset motor and a thermostatic time delay instrument in circuit with said second switch means and reset motor for delaying the energization of said reset motor a predetermined interval after the said stopping of the flow of fluid.

20. In a metering system, metering means, electrically actuated means controlling the flow of fluid therethrough, a reset motor to reset the parts to initial position, a control shaft, means for driving said shaft in one direction by said metering means and in the opposite direction by said reset motor, switch means in circuit with said controlling means, a second switch means in circuit with said reset motor, means actuated by said shaft when rotated by said meter for actuating said first switch means to actuate said controlling means to stop the flow of fluid through said metering means and simultaneously actuate said second switch means to operate said reset motor and a thermostatic time delay instrument and holding relay in circuit with said second switch means and reset motor for delaying the energization of said reset motor a predetermined interval after the said stopping of the flow of fluid.

21. A differential mechanism for a fluid metering system having a meter, means controlling the flow of fluid through said meter, a reset motor to reset the parts to initial position and a control for said controlling means and reset motor, said differential including a differential shaft, a spider fast to said differential shaft, a ring gear at each side of said spider and rotatable around said shaft and pinions rotatably mounted on said spider and meshing with both of said ring gears, one of said ring gears being driven by said meter and being operative to rotate said differential shaft in one direction to actuate said control to actuate said controlling means to stop the flow of fluid through said metering means and energize said reset motor, and the other of said ring gears being driven by said reset motor and being operative to rotate said differential shaft in the opposite direction to actuate said control to deenergize said reset motor.

22. A differential mechanism for a fluid metering system having a meter, means controlling the flow of fluid through said meter, a reset motor to reset the parts to initial position and a control for said reset motor, said differential including a housing, a shaft journaled in the opposite walls of said housing and projecting outwardly therefrom, a spider fast to said differential shaft within said housing, a ring gear at each side of said spider and rotatable around said shaft, pinions rotatably mounted on said spider and meshing with both of said ring gears, one of said ring gears being driven by said meter and being operative to rotate the projecting end of said shaft in one direction to actuate said control to actuate said controlling means to stop the flow of fluid through said metering means and energize said reset motor and the other of said ring gears being driven by said reset motor and being operative to rotate the projecting end of said shaft in the opposite direction to actuate said control to deenergize said reset motor.

EDWARD HAROLD BRAYER.